United States Patent [19]
Köster et al.

[11] Patent Number: 5,775,254
[45] Date of Patent: Jul. 7, 1998

[54] VALVE ASSEMBLY FOR A MILKING MACHINE

[75] Inventors: Ludger Köster, Naperville, Ill.; Ralf Wohlbrück, Oelde, Germany

[73] Assignee: Westfalia Separator Aktiengesellschaft, Oelde, Germany

[21] Appl. No.: 602,755

[22] PCT Filed: Sep. 7, 1994

[86] PCT No.: PCT/EP94/02989

§ 371 Date: Feb. 15, 1996

§ 102(e) Date: Feb. 15, 1996

[87] PCT Pub. No.: WO95/10935

PCT Pub. Date: Apr. 27, 1995

[30] Foreign Application Priority Data

Oct. 20, 1993 [DE] Germany ............... 43 35 699.0

[51] Int. Cl.⁶ .................................................. A01J 5/16
[52] U.S. Cl. .................................................. 119/14.38
[58] Field of Search ............... 119/14.37, 14.38, 119/14.39; 137/810, 812, 813, 826; 261/117

[56] References Cited

U.S. PATENT DOCUMENTS 1,727,501  9/1929  Budach ................... 119/14.38
2,986,117  5/1961  Ronaldson ............... 119/14.38
4,034,712  7/1977  Duncan ................... 119/14.38
4,827,961  5/1989  Nitzberg et al. ......... 137/812

FOREIGN PATENT DOCUMENTS 197711   11/1977  U.S.S.R.
2182233   5/1987  United Kingdom.

Primary Examiner—John G. Weiss
Assistant Examiner—David J. Cho
Attorney, Agent, or Firm—Sprung Kramer Schaefer & Briscoe

[57] ABSTRACT

A valve assembly for a milking machine having teat cups. Each teat cup has a shell and a rubber lining, a pulsing chamber between the shell and the lining, and a pulsator for alternately pressurizing the pulsing chamber to atmospheric pressure and evacuating the pulsing chamber through a pulsation-forwarding line. The pressurization and evacuation are timed in accordance with a cross-section of a channel that conveys air into and out of the pulsing chamber. The valve assembly has a bypass channel associated with the air channel and a valve shut-off element in the bypass channel that opens when air is evacuated from the pulsing chamber and closes when pressurizing air enters the pulsing chamber.

6 Claims, 2 Drawing Sheets

VALVE ASSEMBLY FOR A MILKING MACHINE

BACKGROUND OF THE INVENTION

The present invention concerns a valve assembly for a milking machine. Each of the machine's teat cups comprises a shell and a rubber lining. There is a pulsing chamber between the shell and the lining. A pulsator alternately pressurizes the pulsing chamber to atmospheric pressure and evacuates it by way of a pulsation-forwarding line. The pressurization and evacuation are timed in accordance with the cross-section of a passage that conveys air into and out of the pulsing chamber.

The pulsing chamber is characterized by four phases, specifically an evacuating phase, an evacuated phase, a pressurizing phase, and a pressurized phase. When there is a lot of milk flowing, the vacuum in the pulsing chamber is known to be more powerful than that inside the lining. The lining accordingly inflates during the evacuated phase. This is called ballooning. Highly elastic linings are desirable because they are gentle to the teat, but they tend to snap back against it in the pressurizing phase. The impact can damage the udder.

A milking machine is known from German 3 524 380 A1. The rate of change of pressure during the evacuating phase and pressurizing phase is dictated by the cross-section of a pressurizing line. The pressure accordingly establishes more rapidly in the pressurizing phase, promoting the aforesaid impact.

SUMMARY OF THE INVENTION

The object of the present invention is to improve the above type of milking machine to the extent that the animal's teats will be treated gently.

This object is attained in accordance with the present invention in the above type of milking machine in that a bypass channel is associated with the air channel, whereby the bypass channel includes a valve shut-off element that opens when air enters from the pulsing chamber and closes when air enters the pulsing chamber.

The air channel is designed to ensure that the pressure will become established slowly enough during the pressurizing phase to prevent the teat-cup lining from snapping back against the teat. The bypass channel can simultaneously be designed to ensure that the pressure is eliminated just as rapidly. This feature makes it possible to use softer linings, which stimulate the teats more gently.

The valve shut-off element in another advantageous embodiment of the present invention is one-way and allows the air to flow only out of the pulsing chamber. This feature is a simple means of differentiating between the flow rate during the evacuating phase and that during the pressurizing phase.

The valve shut-off element in another advantageous embodiment can be activated by outside means, i.e., electrically activated. In this embodiment the pressure can be varied during the pressurizing phase in accordance with when and how long the valve shut-off element is activated.

Further advantageous embodiments are recited in the remaining subsidiary claims.

This object can also be attained in the above type of milking machine wherein the air channel constitutes a vortex chamber with one tangential connection and one axial connection. Vortex chambers of this type impede flow through the tangential connection more powerfully than the flow through the axial connection. This is due to the vortex induced in the air entering tangentially. An appropriate design can accordingly decelerate the establishment of pressure in the pulsing chamber, whereas it can be eliminated essentially more rapidly.

Embodiments of the present invention will now be specified with reference to the accompanying drawings, wherein

DETAILED DESCRIPTION OF THE INVENTION

Figure 1:
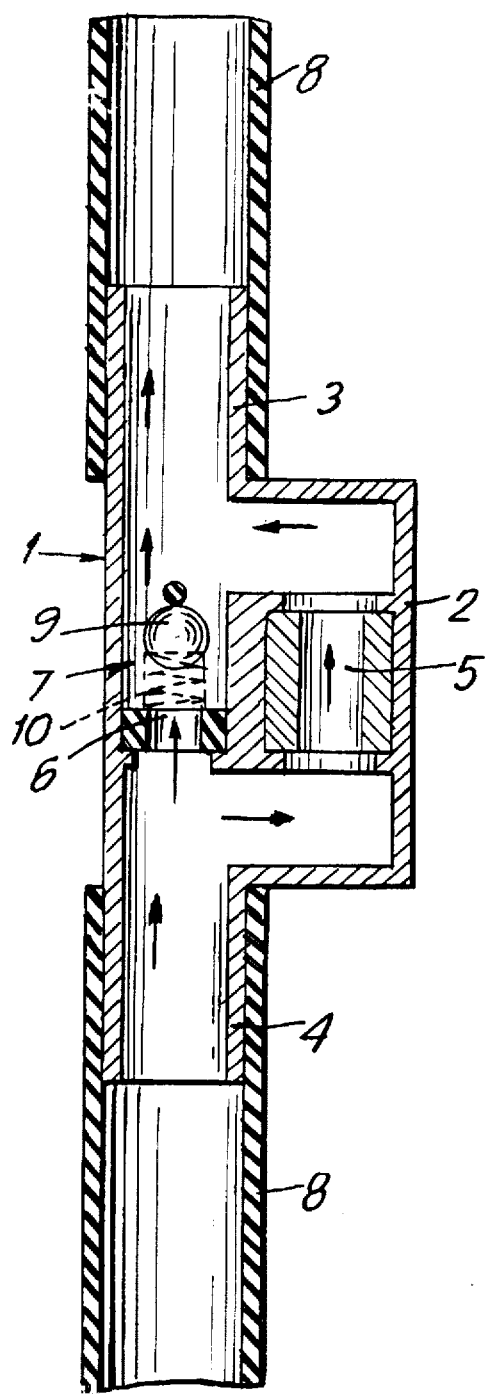
FIG. 1 illustrates a valve housing with an air channel and a bypass channel.

The valve assembly 1 illustrated in FIG. 1 comprises a housing 2 with two connection tubes 3 and 4. Housing 2 accommodates an air channel 5 and a bypass channel 6. Bypass channel 6 accommodates a valve shut-off element 7. Connection tube 3 communicates with a pulsator and connection tube 4 with the pulsing chamber of a teat cup through a pulsation-forwarding line 8, which is divided in two in the vicinity of valve assembly 1. Valve shut-off element 7 accommodates a obturator 9 that is maintained open by a compression spring 10.

In the evacuating phase air flows out of the pulsing chamber of an unillustrated teat cup by way of pulsation-forwarding line 8 and connection tube 4, air channel 5, and bypass channel 6, the valve shut-off element 7 which is kept open by the air, to connection tube 3. Connection tube 3 communicates with an unillustrated pulsator. During the pressurizing phase on the other hand the air will flow in the other direction, with valve shut-off element 7 automatically closed. During the evacuating phase accordingly, the air has a much more ample cross-section to flow through than it had during the pressurizing phase. Gentle stimulation of the teats is accordingly ensured. Compression spring 10 will lift obturator 9 toward the end of the pressurizing phase as the vacuum in the pulsing chamber becomes weaker. Bypass channel 6 will accordingly be open again even before the pressurizing phase terminates, ensuring satisfactory aeration of the pulsing chamber. Obturator 9 will accordingly then also be correctly positioned as the next evacuating phase begins. Compression spring 10 will also ensure that the bypass channel 6 remains open when a pulsator is vibrating very rapidly as milking commences in order to stimulate the teats, because the air cannot flow rapidly enough during this phase to overcome the force of the spring.

Figure 2:
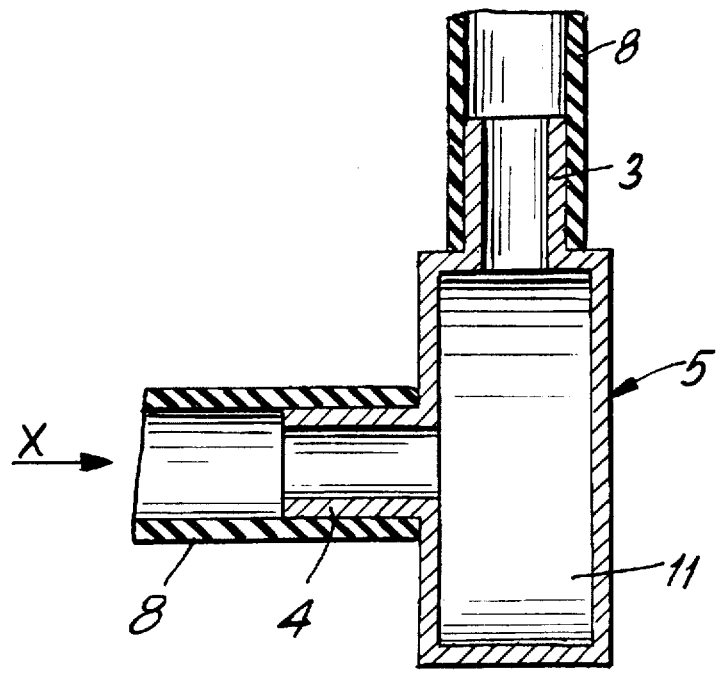
FIG. 2 illustrates an air channel in the form of a vortex chamber.

The air channel 5 in the embodiment illustrated in FIG. 2 constitutes a vortex chamber 11. Connection tube 3 is a tangential connection in this embodiment and connection tube 4 an axial connection. Tangential connection tube 3 communicates with a pulsator and axial connection tube 4 with the pulsing chamber in a teat cup. During the evacuating phase the air flows out of the pulsing chamber, through pulsation-forwarding line 8 and axial connection tube 4, and into the center of vortex chamber 11 and hence to the pulsator through tangential connection tube 3 and the other half of pulsation-forwarding line 8. Since air entering axially is impeded less than air entering tangentially, the pressure will be eliminated in the pulsing chamber very rapidly. During the pressurizing phase on the other hand, the air will flow in the other direction, into vortex chamber 11 through tangential connection tube 3, and hence into the pulsing chamber in a teat cup through axial connection tube 4 and pulsation-forwarding line 8. The tangential flow and the resulting vortex will create significant impedance, and the pressure in the pulsing chamber will become established slowly.

Figure 3:
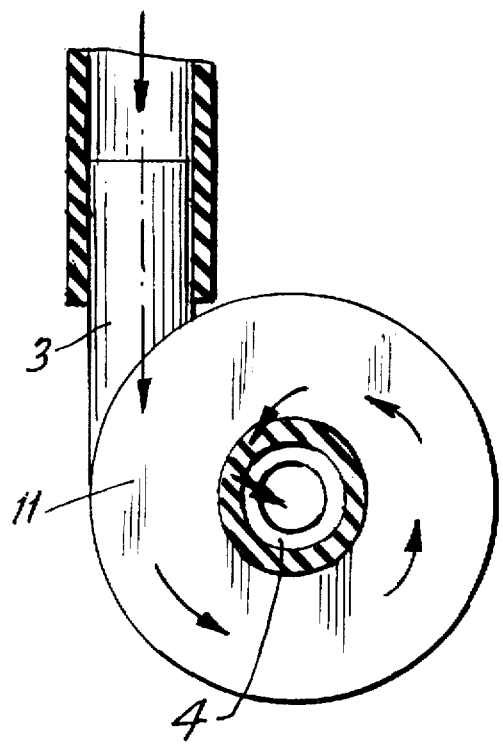
FIG. 3 is a view from the direction indicated by arrow X in FIG. 2.

FIG. 3 illustrates the positions of tangential connection tube 3 and axial connection tube 4 in relation to vortex chamber 11.

We claim:

1. A valve assembly for a milking machine having a teat cups, wherein each teat cup comprising a shell and a rubber lining, a pulsing chamber between the shell and the lining, and a pulsator for alternately pressurizing the pulsing chamber to atmospheric pressure and evacuating the pulsing chamber through a pulsation-forwarding line, wherein the pressurization and evacuation are timed in accordance with a cross-section of a channel that conveys air into and out of the pulsing chamber; the valve assembly comprising a bypass channel associated with the air channel, and a valve shut-off element in the bypass channel that opens when air is evacuated from the pulsing chamber and closes when pressurizing air enters the pulsing chamber such that flow impedance is greater for the pressurizing air than for the evacuating air.

2. The valve assembly as in claim 1, whereby the valve shut-off element is one-way.

3. The valve assembly as in claim 1, wherein the valve shut-off element is electrically activated.

4. The valve assembly as in claim 1, wherein the air channel and the bypass channel are accommodated in a common housing.

5. The valve assembly as claim 1, wherein the housing is accommodated in the pulsation-forwarding line.

6. A valve assembly for a milking machine having teat cups, each teat cup comprising a shell and a rubber lining, a pulsing chamber between the shell and the lining and a pulsator for alternately pressurizing the pulsing chamber to atmospheric pressure and evacuating the pulsing chamber through a pulsation-forwarding line, wherein the pressurization and evacuation are timed in accordance with a cross-section of a channel that conveys air into and out of the pulsing chamber, wherein the air channel comprises a vortex chamber with one tangential connection tube and one axial connection tube and wherein pressurizing air flows from the tangential connection tube to the vortex chamber and evacuating air flows from the axial connection tube to the vortex chamber and flow impedance is greater for the pressurizing air flow than for the evacuating air flow.

* * * * *